(12) United States Patent
Wakagi et al.

(10) Patent No.: US 6,300,995 B1
(45) Date of Patent: Oct. 9, 2001

(54) LIQUID CRYSTAL DISPLAY DEVICE UTILIZING IN-PLANE-SWITCHING SYSTEM AND HAVING ALIGNMENT FILM SEPARATING PICTURE ELEMENT ELECTRODE OR COUNTER ELECTRODE FROM LIQUID CRYSTAL LAYER

(75) Inventors: Masatoshi Wakagi, Hitachi; Masahiko Ando; Ritsuo Fukaya, both of Hitachinaka, all of (JP)

(73) Assignee: Hitachi, LTD, Tokyo (JP)

( * ) Notice: Subject to any disclaimer, the term of this patent is extended or adjusted under 35 U.S.C. 154(b) by 0 days.

(21) Appl. No.: 09/405,229

(22) Filed: Sep. 24, 1999

Related U.S. Application Data

(63) Continuation of application No. 08/906,475, filed on Aug. 5, 1997, now Pat. No. 5,995,187.

(30) Foreign Application Priority Data

Aug. 7, 1996 (JP) .................................................. 8-208438

(51) Int. Cl.[7] .................................................. G02F 1/1345
(52) U.S. Cl. .............................................................. 349/141
(58) Field of Search ..................................... 349/141, 132

(56) References Cited

U.S. PATENT DOCUMENTS

| | | |
|---|---|---|
| 4,345,249 | 8/1982 | Togashi . |
| 5,576,867 | 11/1996 | Baur et al. . |
| 5,598,285 * | 1/1997 | Kondo et al. .......................... 349/39 |
| 5,841,498 * | 11/1998 | Baur et al. ........................... 349/141 |
| 5,886,762 | 3/1999 | Yamazaki et al. . |
| 5,892,562 | 4/1999 | Lee et al. . |

* cited by examiner

Primary Examiner—Kenneth Parker
(74) Attorney, Agent, or Firm—Antonelli, Terry, Stout & Kraus, LLP

(57) ABSTRACT

A liquid crystal display device includes a pair of substrates, a liquid crystal layer supported between the pair of substrates, a plurality of gate electric wirings provided on one of the pair of substrates, a plurality of drain electric wirings respectively intersecting with the plurality of gate electric wirings in a matrix configuration, a plurality of thin film transistors formed on respective points of the gate electric wirings and the drain electric wirings, a plurality of common electric wirings extending in the same direction as the gate electric wirings, a plurality of picture elements with at least one of the picture elements being respectively surrounded by the gate electric wirings and the drain electric wirings, and a plurality of counter electrodes connected to the common electric wirings and extending in the same direction as the drain electric wirings. A plurality of picture element electrodes made of at least one of conductive oxide and graphite are connected to the thin film transistors and extend in the same direction as the drain electric wirings. An electric field having a component parallel to one of the pair of substrates is produced in the liquid crystal layer by an electric voltage applied between the counter electrodes and the picture element electrodes, and the respective picture element electrodes are in contact with the liquid crystal layer directly or through an alignment film.

11 Claims, 17 Drawing Sheets

LIQUID CRYSTAL DISPLAY DEVICE UTILIZING IN-PLANE-SWITCHING SYSTEM AND HAVING ALIGNMENT FILM SEPARATING PICTURE ELEMENT ELECTRODE OR COUNTER ELECTRODE FROM LIQUID CRYSTAL LAYER

CROSS REFERENCE TO RELATED APPLICATION

This is a continuation of U.S. application Ser. No. 08/906,475, filed Aug. 5, 1997, now U.S. Pat. No. 5,995,187 the subject matter of which is incorporated by reference herein.

BACKGROUND OF THE INVENTION

The present invention relates to a liquid crystal display device for driving a liquid crystal by means of an in-plane-switching system to apply an electric field which is almost parallel to a substrate between a picture element electrode and counter electrode.

An active matrix type liquid crystal display device using an active component, such as a thin film transistor (TFT), is widely used as a display, having such characteristics as being thin and light weight, and having a high displaying quality. A liquid crystal display device of this type is constructed with a liquid crystal provided between an active matrix substrate having a TFT element and an opposite substrate, and an electric field is applied between picture element electrodes and a counter electrode so as to drive and control the liquid crystal, whereby light incident on the liquid crystal is modulated so as to form an image.

Further, in order to widen the viewing angle of a liquid crystal display device, a liquid crystal display device using an in-plane-switching system has been proposed, in which the picture element electrode and the counter electrode are formed on the active matrix substrate, and an electric field is applied in parallel to the surface of the substrate. Such a device is described, for example, in Proceedings of the 15th International Display Research Conference, p. 707 (1995) or Japanese Patent Laid-open 7-36058 Bretin. The in-plane-switching system has the advantage of being able to provide a wide visual angle, because the liquid crystal is controlled by an electric field applied in a substantially transverse direction relative to the viewing angle.

The conventional display device using in-plane-switching has a configuration in which metal films, formed under a protective insulation film, serve as the picture element electrodes and the counter electrodes thereto. However, since the electric field is applied to the liquid crystal through the protective insulation film, an electrical voltage loss occurs, with the result that the driving voltage becomes large, causing a problem in that the power consumption increases. Moreover, while it is effective to make the spacing between the picture element electrodes and the counter electrodes big in order to enlarge the aperture ratio, this requires the driving voltage to be even larger. Since the threshold driving voltage of the liquid crystal is restricted by the upper limit of the driving voltage, there arises a problem in that the selection of a liquid crystal which has a fast responsiveness is limited.

Such an increase in the power consumption caused by such an electrical voltage loss may be avoided by providing a contact hole which forms an aperture in the gating isolation film and by providing an electrode for driving the liquid crystal through this aperture, as described in Japanese Patent Laid-open No. issue 7-128683 bulletin. However, the usual metal electrode has a problem in that it is corroded by the liquid crystal composition, so that it is necessary to form a protective insulation film on top of the electrodes. Naturally, in this case, the electrical voltage loss which occurs due to the protective insulation film increases even more.

SUMMARY OF THE INVENTION

An object of the present invention is to reduce losses in the driving voltage applied to the liquid crystal, by providing an active matrix substrate in which degradation of the metal electrode is prevented in a liquid crystal display device.

In the liquid crystal display device of the present invention, plural gate electric wiring, plural drain electric wiring intersecting therewith in a matrix state, plural thin film transistors formed opposite to each intersection of the gate and drain electric wiring, and plural common electric wiring extending in the same direction as the gate electric wiring are provided on one of a pair of substrates. At least one picture element is formed in each field surrounded by the plural gate electric wirings and the drain electric wirings, said each picture element having a counter electrode extending in the same direction as the drain electric wiring, connected to the common electric wiring corresponding to each picture element, and a picture element electrode extending in the same direction as the counter electrode connected to the thin film transistor corresponding to each picture element. By an electrical voltage applied between said counter electrode and said picture element electrodes, an electric field is generated that has a parallel component mainly opposite to said one substrate in the liquid crystal layer. The counter electrode contacts the liquid crystal layer directly.

According to an embodiment of the present invention, the insulator layer is formed on top of the common electric wiring, and the counter electrode is connected with the common electric wiring through the contact hole formed by this insulator layer. The insulator layer consists of a first insulator layer and a second insulator layer, the first insulator layer being formed on the gate electric wiring and the common electric wiring, and the second insulator layer being formed on the drain electric wiring and the plural thin film transistors.

Moreover, the source electrode of each thin film transistor is formed on the first insulator layer and serves as the picture element electrode. Furthermore, the source electrode may be connected to the picture element electrode through the contact hole formed by the second insulator layer mentioned above. In this case, the picture element electrode contacts the liquid crystal layer directly, the counter electrode. It is preferable that the counter electrode or the picture element electrode consists of a conductive oxide film or graphite.

According to another embodiment of the present invention, a drain electric wiring terminal and a gate electric wiring terminal, in which the drain electric wiring and the gate electric wiring are connected to the drive circuitry, are constructed with the conductive oxide film or the graphite.

BRIEF DESCRIPTION OF THE DRAWINGS

These and other objects, features and advantages of the present invention will be understood more clearly from the following detailed description with reference to the accompanying drawings, wherein.

DESCRIPTION OF THE PREFERRED EMBODIMENTS

Figure 1:
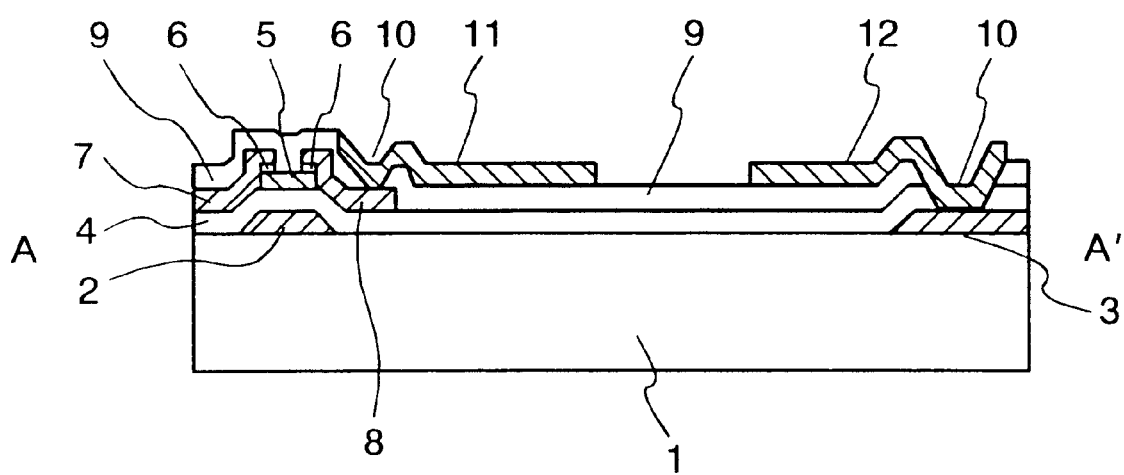
FIG. 1 is a sectional view of an active matrix substrate forming an embodiment 1 of the present invention.

A gate electric wiring formed on a transparent insulator substrate (scanning electric wiring) and a metal film serving as a common electric wiring are made of Cr, Al, Ta or alloy thereof. Moreover, in a gate insulator film, a semi-conductor film, SiN film, SiO film, or a-Si film made by the CVD method (Chemical Vapor Deposition method) are used, and furthermore, N (+) a-Si (phosphorus doped a-Si is used for the contact layer. These films are processed as described, and the TFT is formed as an active component. Furthermore, as the drain electric wiring (image electric wiring) and the source electrode (picture element electrode) of the TFT, Cr, Al, Ta or alloy thereof are used.

Furthermore, as a protective insulator film, a SiN film mace by a chemical vapor deposition method is used. After forming the protective insulator film, a contact hole is formed for effecting contact between the source electrode and the common electric wiring. Moreover, a contact hole for a terminal of the gate electric wiring, the common electric wiring and the drain electric wiring are formed, and a picture element electrode and an counter electrode are formed thereon.

As the picture element electrode and the counter electrode, a conductive oxide film, such as ITO (Indium Tin Oxide) and graphite, are desirable. These are stable chemically, and so even if the liquid crystal is touched, a good electrical characteristic may be maintained. Moreover, since the terminal for the gate electric wiring, the common electric wiring and the drain wiring are coated with a conductive oxide film, a stable contact characteristic may be obtained. Moreover, since the picture element electrode and the courter electrode of the conductive oxide film formed on the insulation protective film may apply a direct electric field on the liquid crystal, the electrical voltage loss is small and the driving voltage for the liquid crystal may be small in comparison with a case wherein the electric field is applied through a conventional insulation protective film. Finally, any danger that the picture element electrode and the counter electrode of the conductive oxide film will be deteriorated by the enclosed liquid crystal composition is extremely small.

In the conventional liquid crystal display device, an alignment film of the liquid crystal is formed, and the thickness of said film is in the order of 1000 Å, so that any action as a passivation film of the semiconductor device does not arise, and the degradation of metal film by the liquid crystal composition cannot be prevented, because there are defects, such as pinholes, as well. However, the conductive oxide film is superior because such a degradation does not arise.

As such a conductive oxide film, an ITO (Indium Tin Oxide) film may be used. ITO includes amorphous material ITO and crystalline structure ITO, and in order to reduce the contact resistance of the source electrode, the common electric wiring, the gate electric wiring and the drain electric wiring, it is desirable to use a crystalline structure ITO film. The conductive oxide film made of ITO etc., referred to as a transparent conductive film, is able to transmit a visible light. Although a component of the electric field perpendicular to the substrate on the transparent conductive film becomes larger as the applied electric field usually becomes zero or smaller than zero, when displaying a part in black, this part may shade the light too, if the optics are designed so as to make the polarized light transmission factor of the liquid crystal almost zero.

Moreover, it is possible to shade the light with a configuration formed by overlapping metal films on the transparent conductive film. For example, the metal source electrode and for common electrode are formed to be overlapped when viewed in a direction vertical to the transparent conductor film and the substrate. In such a configuration, in order to make the aperture ratio larger, an electrode consisting of the above metal films overlapping with the picture element electrode and the counter electrode in the aperture, is formed to have the same shape as the picture element electrode and the counter electrode. On this account, a photo lithography process is used for the formation of the picture element electrode and the counter electrode.

In this case, there is also a system to form the resist pattern by exposing a rear face on the substrate. In particular, the ITO film surface is coated with a resist film, a pattern except for the picture element aperture is exposed from the surface and also from the rear face, whereby the resist pattern is formed to have the same shape as the metal film in the aperture. By etching, the picture element electrode and the counter electrode are processed to have a pattern which is the same as the metal film in the aperture. By this rear face exposure process, the electrode width of the picture element electrode and the counter electrode may be made smaller, and at the same time, it becomes possible to restrain the shading formed by the metal film to a needed minimum size. By forming this metal film with the common electric wiring and the source electrode, the device may be made without adding a further production process. Moreover, since the electric potential of the picture element electrode and the counter electrode becomes the same as that of the metal film corresponding to the respective electrodes electrically, no capacitance need be formed. By providing the rear face exposure in accordance with the present invention, the picture element electrode and the counter electrode may be formed to have the same shape as the metal film in the aperture, thereby, it may be processed without considering the layout precision of the metal film. Moreover, since shading the light at the drain electric wiring and the opposition electrode interval next to the drain electric wiring, by forming a shading layer using a metal film similar to the gate electrode so as to overlap these electrodes as seen in a direction transverse to the substrate, the black matrix of the opposite substrate corresponding to this part can be omitted. The location precision of the active matrix substrate and the courter electrode, when they are formed, is about several to ten $\mu$m, and the width of the black matrix needs to be designed broadly as several to ten $\mu$m. On this account, the aperture ratio of the liquid crystal panel is improved by omitting the black matrix.

An alignment film is formed on the active matrix substrate providing the picture element electrode and the counter electrode on top of the protective insulator film, and next, the opposite substrate is mounted thereto through the use of distance setting beads so as to provide a liquid crystal cell. A predetermined liquid crystal composition is enclosed in said cell, whereby a liquid crystal display device is provided.

Because the driving voltage of the liquid crystal display device may be small, the power consumption thereof may be reduced. Moreover, by using the active matrix substrate of the present invention, the degree of freedom to select a preferred liquid crystal for a particular threshold driving voltage may be widened, and so it becomes possible to manufacture a liquid crystal display device having a fast responsiveness. Moreover, because the electrical voltage loss is small compared with the conventional type device, it becomes possible to make the spacing between the picture element electrode and the counter electrodes larger, and so the aperture ratio is improved. Thereby, a bright display panel is obtained, and the power consumption of the backlight may be made small.

In the formation of the picture element electrode and the counter electrode formed of an ITO film, the terminal is formed by a production process which is the same as ITO film coating, and so the active matrix substrate of the present invention may be manufactured with almost the same number of production processes as usual, with the result that there is hardly any increase in the manufacturing cost. Moreover, as the electric field applied to the liquid crystal increases by using the active matrix substrate of the present invention, it becomes possible to select a liquid crystal having a larger threshold. That is, it becomes possible to select a liquid crystal, which has a fast responsiveness, and so a liquid crystal display device having a good moving picture characteristic and fast response is easily provided.

Moreover, the spacing between the picture element electrode and the courter electrodes is made larger, and the metal film of the same layer as the gate electrode is used to overlap on the drain electric wiring and the courter electrode next to the drain electric wiring, whereby, a shading layer is formed. With such a construction, the black matrix corresponding to this part may be omitted, the aperture ratio becomes larger, a bright display is provided, and the power consumption of the backlight may be small.

Based on the drawings, various embodiments of the present invention will now be explained more specifically.

[Embodiment 1]

Figure 2:
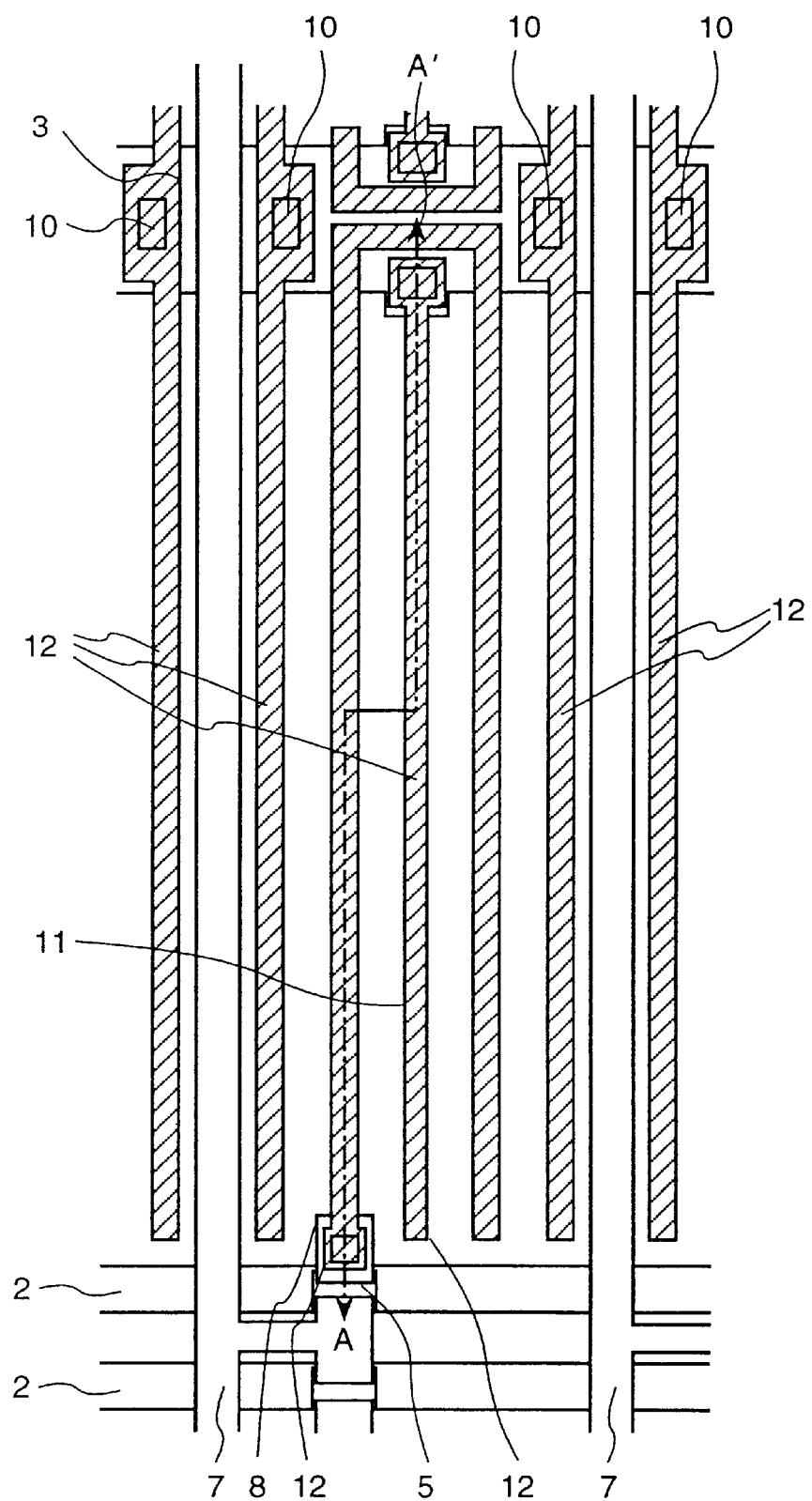
FIG. 2 is a plane view of the picture element of FIG. 1, and the A–A' cross section of this figure corresponds to FIG. 1.

A sectional view of a picture element of an active matrix substrate in accordance with the present invention is shown in FIG. 1, and a plane view thereof is shown in FIG. 2.

A Cr film having a thickness of 200 nm is formed on a transparent substrate 1 by a sputtering method. Subsequently, the gate electric wiring 2 and the common electric wiring 3 are formed thereon by using a photo lithography method. Then, the substrate 1 on which the gate electric wiring 2 and the common electric wiring 3 are formed is provided in a plasma CVD device with a SiN film of 350 nm as the gating insulator film 4, a a-si film of 200 nm as a semi-conductor film 5, and a n(+)a-si film of 30 nm as a contact layer 6. As the materials gas, a mixture gas of SiH4, NH3, H for forming a SiN film, a mixture gas of SiH4 and H2 for forming a a-Si memblem, and a mixture gas of SiH4 and H2 with the further addition of PH3 for forming a n(+)a-si memblem are used. Then, n(+)a-si and a-si are formed like islands so as to form a TFT by using a photo lithography method.

Next, a Cr film is formed to be a memblem having a thickness of 200 nm by a sputtering method, and a drain electric wiring 7 and a source electrode 8 are formed by using a photo lithography method. The n(+)a-si film of the channel is removed by dry etching afterwards. A protective insulator film 9 (SiN) is formed by a plasma chemical vapor deposition method thereon. Using a photo lithography method again, in the SiN gate insulator film 4 and the protective insulator film 9, respective contact holes 10 are formed to reach the source electrode 8 and the common electric wiring 3, the gate electric wiring terminal, and a contact hole of the drain electric wiring terminal are formed.

A crystalline ITO film is formed to have a thickness of 200 nm at a substrate temperature of 220 degrees by a DC magnetron sputtering method. The ITO film is processed by a photo lithography method to form the picture element electrode 11 and the counter electrode 12, and the drain electric wiring terminal, the gate electric wiring terminal and the drain electric wiring terminal are formed. The picture element electrode 11 and the counter electrode 12 formed by this process are respectively connected with the source electrode 8 and the common electric wiring 3 electrically.

An alignment film of the liquid crystal (polyimide film) which aligns molecules of the liquid crystal in a predetermined direction is formed on the active matrix substrate already formed, which substrate is then mounted on the opposite substrate through distance setting beads, and the liquid crystal composition is enclosed therein, whereby the liquid crystal display device is obtained.

Figure 3:
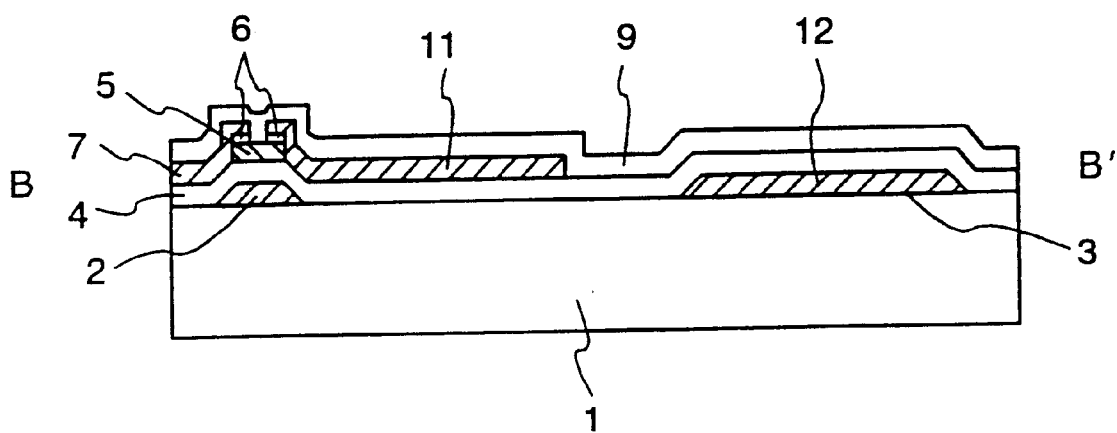
FIG. 3 is a sectional view of a conventional active matrix substrate.
Figure 4:
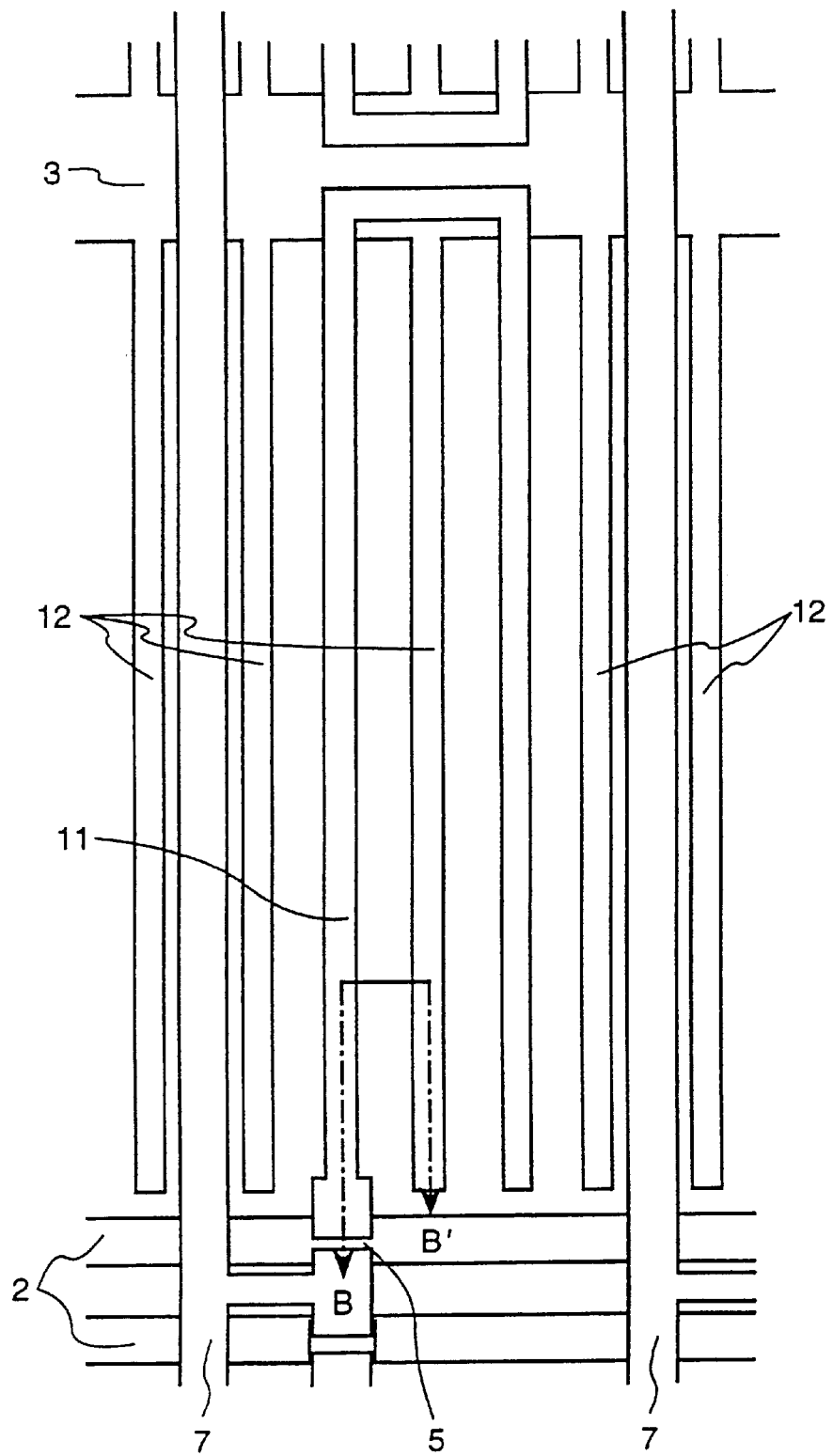
FIG. 4 is a plane view of the picture element of FIG. 3, and the B–B' cross section of this figure corresponds to FIG. 3.

The liquid crystal driving voltage of the above liquid crystal display device may be reduced 20% or more, compared with one using an active matrix substrate having a construction shown in FIG. 3 and FIG. 4. Moreover, because both the picture element electrode 11 and the counter electrode 12 are formed with an ITO film, it has a good effect in that there is hardly any degradation caused by the liquid crystal composition etc.

[Embodiment 2]

Figure 5:
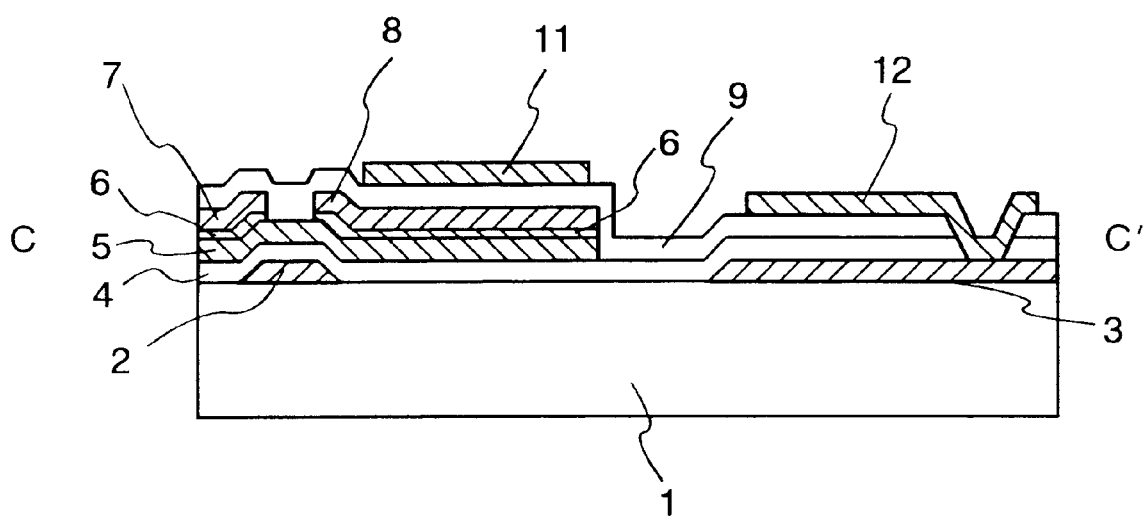
FIG. 5 is a sectional view of an active matrix substrate forming an embodiment 2 of the present invention.
Figure 6:
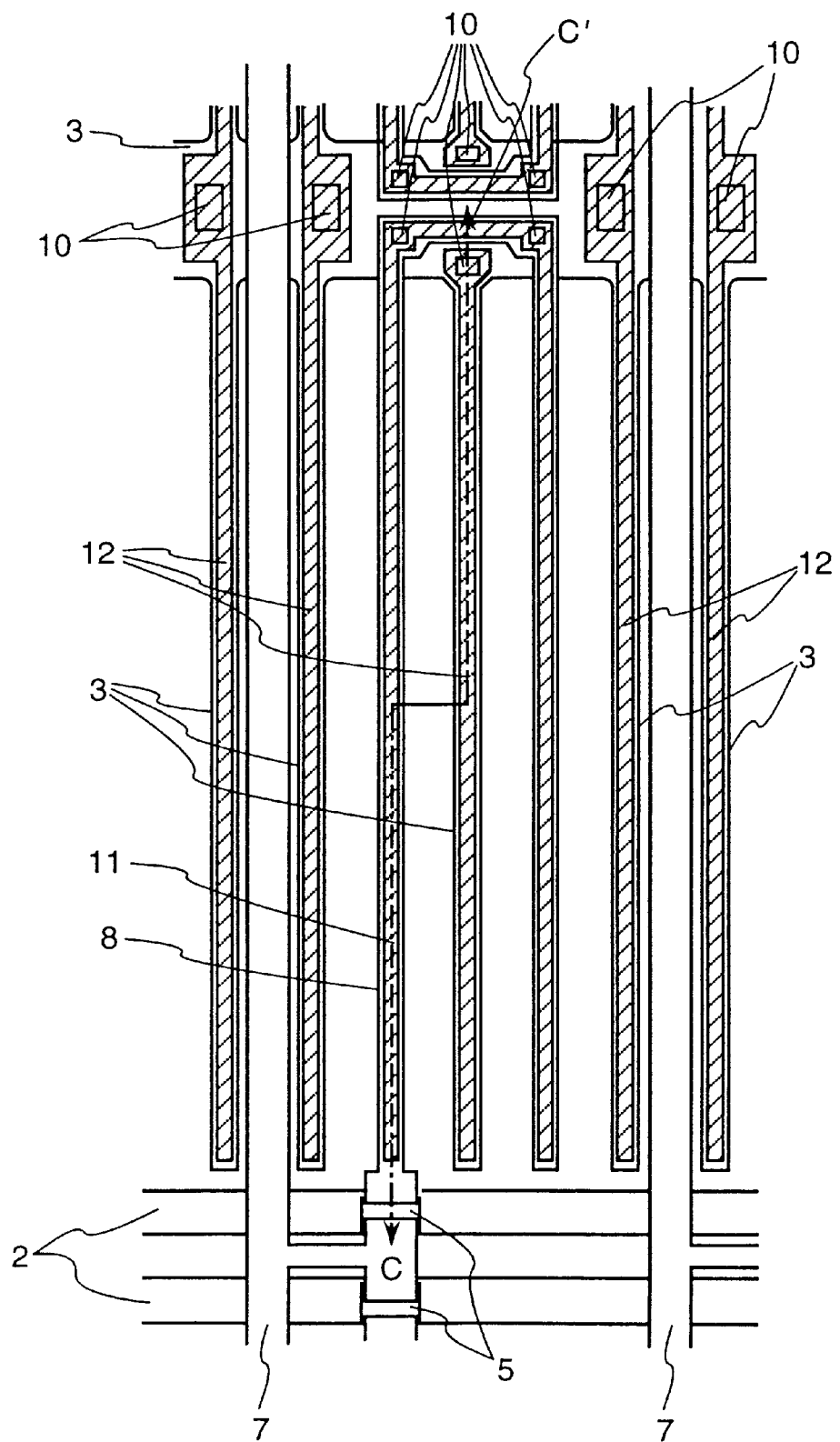
FIG. 6 is a plane view of the picture element of FIG. 5, and the C–C' cross section of this figure corresponds to FIG. 5.

A sectional view of a picture element of the active matrix substrate of the present invention is shown in FIG. 5, and a plane view thereof is shown in FIG. 6.

The gate electrode, the common electrode, the drain electrode and the source electrode are formed with a Cr—Mo alloying film in this embodiment. In order to control the stress of the Cr—Mo alloying film (film thickness 200 nm) formed by a sputtering method on a transparent substrate 1 to a low level, the Mo is kept at 30 to 50 weight %. Moreover, the Cr—Mo alloying may suppress the contact resistance with the ITO film formed later to a low level. Subsequently, the gate electric wiring 2 and the common electric wiring 3 is formed by using a photo lithography method. Here, the common electric wiring of the aperture is processed into a shape to overlap with the counter electrode 12 formed later. Furthermore, in the same way as the embodiment 1, a SiN film forms the gate insulator film 4, a a-Si film forms the semi-conductor film 5, and a n(+)a-Si film forms the contact layer 6.

The Cr—Mo film is formed so as to have a thickness of 200 nm by a sputtering method, and the drain electric wiring 7 and the source electrode 8 are formed by using a photo lithography method. Here, the source electrode 8 is processed to overlap with the picture element electrode 11 formed later. The N(+)a-Si film is removed by a dry etching method afterwards, and the a-Si film is processed like an island using a photo lithography method, whereby the TFT is formed. The protective insulator film 9 (SIN) is formed thereon by a plasma chemical vapor deposition method. The contact holes 10 to reach the source electrode and the common electric wiring are respectively provided in the gate insulator film 4 and the SiN of the protective insulator film 9, and then, the drain electric wiring terminal, the gate electric wiring terminal and the contact hole of the drain electric wiring terminal are formed.

The ITO film is formed to have a thickness of 200 nm by the method as embodiment 1, and a coating film of picture element electrode 11, counter electrode 12, a drain electric wiring terminal, a gate electric wiring terminal and a drain electric wiring terminal are formed using a photo lithography method. The picture element electrode 11 and the counter electrode 12 formed by this process are respectively connected to the source electrode 8 and common electric wiring 3 electrically.

An alignment film is formed on the active matrix substrate mentioned above, and the substrate is then mounted on the opposite substrate through distance setting beads, and a liquid crystal composition is enclosed therein to form the liquid crystal display device. The liquid crystal driving voltage of the above liquid crystal display device may be reduced by 20% or more, compared with one using an active matrix substrate having a construction shown in FIG. 3 and FIG. 4.

[Embodiment 3]

Figure 7:
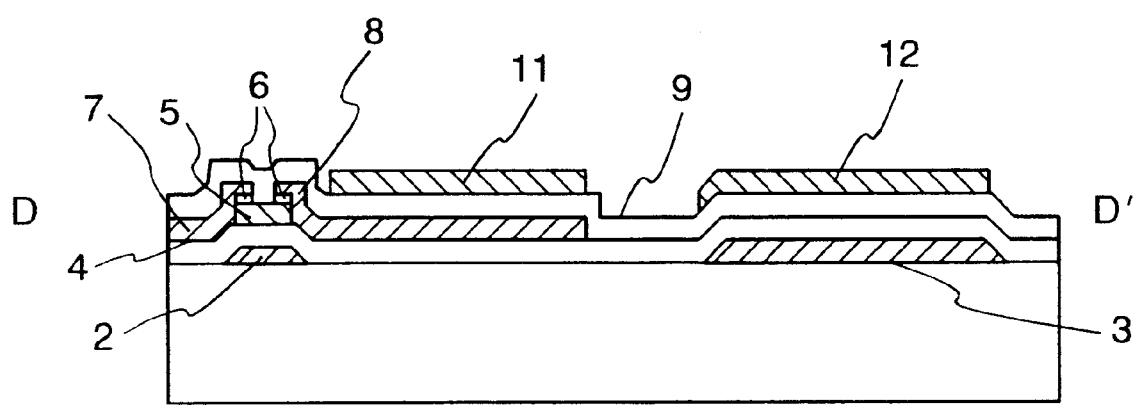
FIG. 7 is a sectional view of an active matrix substrate forming an embodiment 3 of the present invention.
Figure 8:
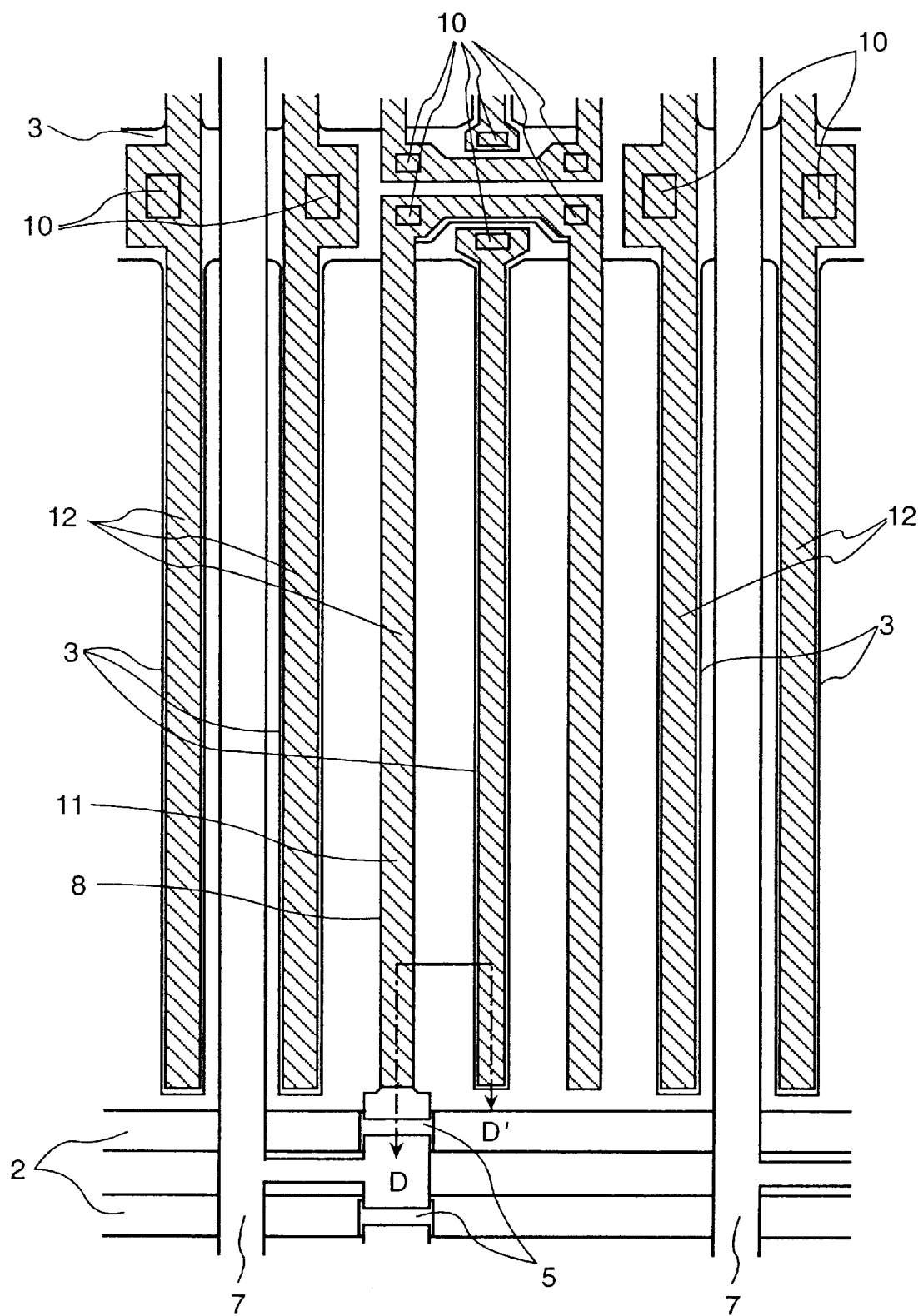
FIG. 8 is a plane view of the picture element of FIG. 7, and the D–D' cross section of this figure corresponds to FIG. 7.

A sectional view of the picture element of the active matrix substrate of the present invention is shown in FIG. 7, and a plane view thereof is shown in FIG. 8.

The gate electric wiring 2, the common electric wiring 3, the gate insulator film 4, the TFT element, the drain electric wiring 7, and the source electrode 8 are formed in the same way as in embodiment 1. The protective insulator film 9 (SIN) is formed by plasma chemical vapor deposition thereon. Furthermore, the gate insulator film 4, the contact hole 10 to connect to the source electrode 8 and the common electric wiring 3 on the SiN film of the protective insulator film 9, and the contact hole of the drain electric wiring terminal, the gate electric wiring terminal and the drain electric wiring terminal are formed by a photo lithography method.

The ITO film is formed to have a thickness of 200 nm in the same way as in embodiment 1. Then, the picture element electrode 11, the counter electrode 12, the coating film of the drain electric wiring terminal, the gate electric wiring terminal and the drain electric wiring terminal are formed by a photo lithography method. Here, the apertures of the picture element electrode 11 and counter electrode 12 are respectively processed to have the same shape as those of the source electrode 8 and the common electric wiring 3 by exposing the substrate 1 from the rear face thereof. Thereby, since the mask matching precision does not need to be considered with respect to the source electrode 8 and the common electric wiring 3, respectively, relative to the picture element electrode 11 and the counter electrode 12, the width of the source electrode 8 and common electric wiring 3 in the aperture may be formed to be smaller and the aperture ratio may be increased.

An alignment film is formed on the active matrix substrate mentioned above, which substrate is then mounted on the opposite substrate through distance setting beads, and the liquid crystal composition is enclosed in it, whereby the liquid crystal display device is obtained. Such a liquid crystal display device as described above has the advantage that the liquid crystal driving voltage is small and a bright image is able to be obtained.

[Embodiment 4]

Figure 9:
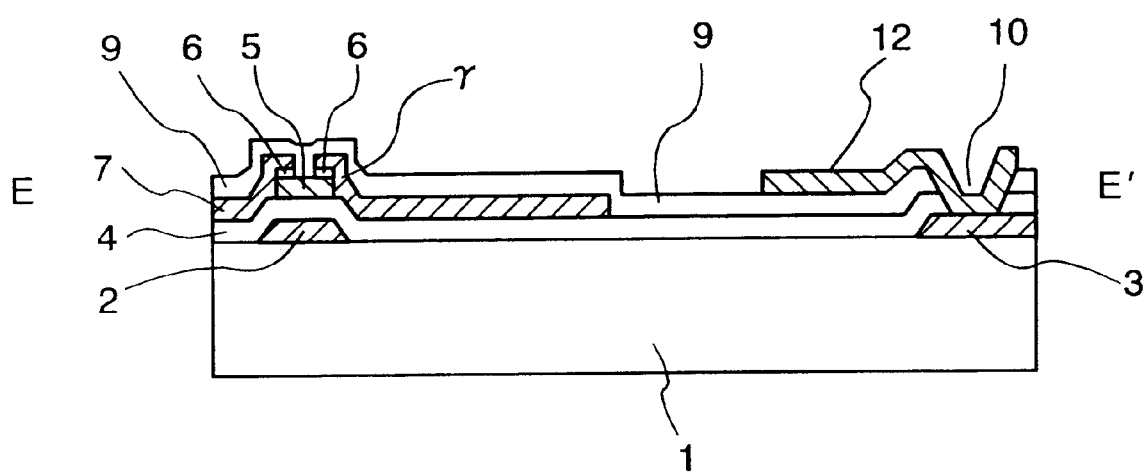
FIG. 9 is a sectional view of an active matrix substrate forming an embodiment 4 of the present invention.
Figure 10:
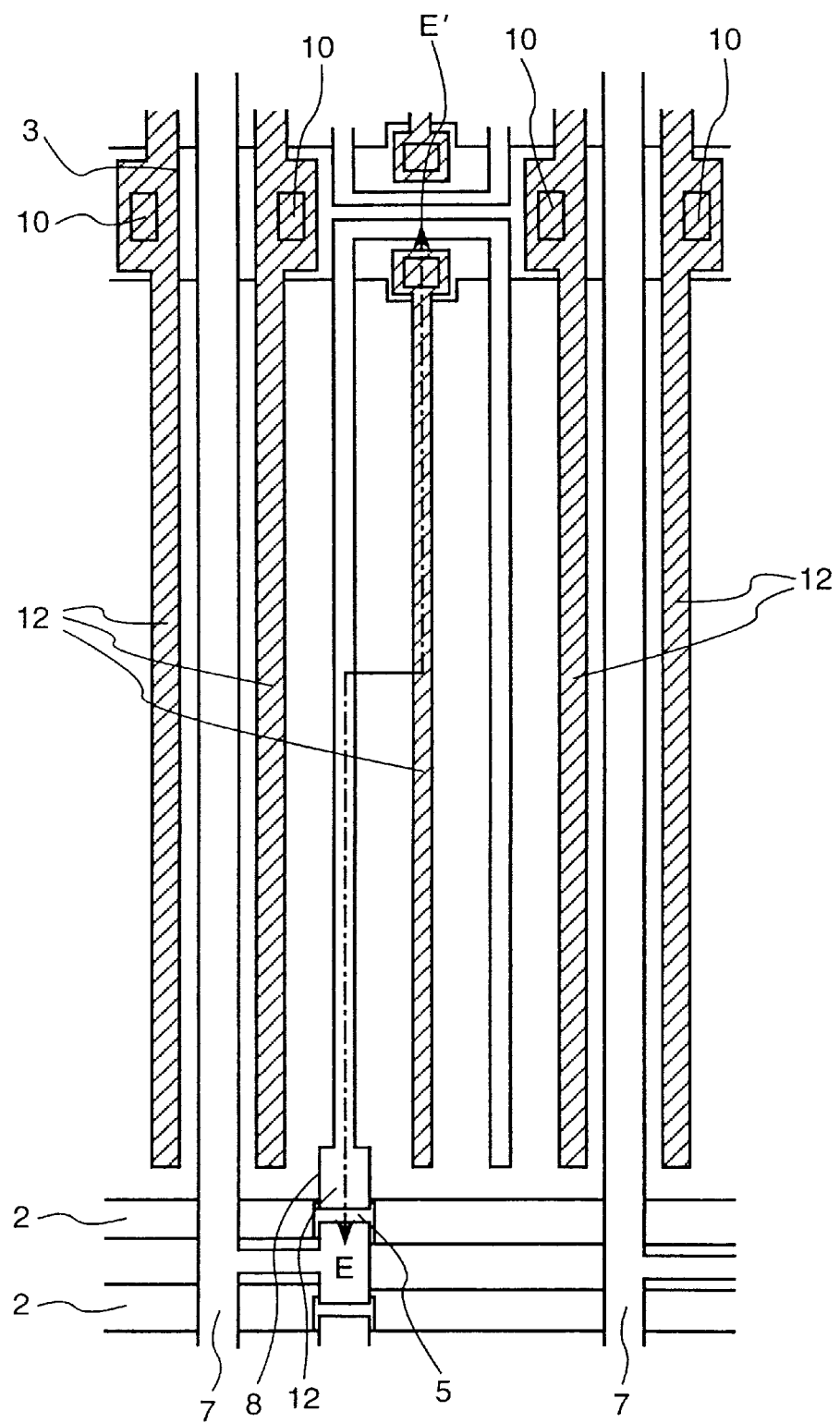
FIG. 10 is a plane view of the picture element of FIG. 9, and the E–E' cross section of this figure corresponds to FIG. 9.

A sectional view of the picture element of the active matrix substrate of the present invention is shown in FIG. 9, and a plane view thereof is shown in FIG. 10.

The gate electric wiring 2, the common electric wiring 3, the gate insulator film 4, the semi-conductor layer 5, the contact layer 6, the drain electric wiring 7 and the source electrode 8 are formed on transparent substrate 1 in the same way as in embodiment 1. The protective insulator film 9, the contact hole 10 and the counter electrode 12 also are formed using the same method as embodiment 1. According to the above-mentioned process, the courter electrode 12 and the common electric wiring 3 are connected to each other electrically.

An alignment film is formed on the active matrix substrate mentioned above, which substrate is then mounted on the opposite substrate through distance setting beads, and the liquid crystal composition is enclosed in it, whereby the liquid crystal display device is obtained. The liquid crystal driving voltage of the above liquid crystal display device may be reduced by 10% or more, compared with one using the active matrix substrate having a construction shown in FIG. 3 and FIG. 4.

In this embodiment, only the counter electrode is constituted to touch the liquid crystal layer directly, and the source electrode is formed of metal, so that it serves as the picture element electrode. By the construction employed in this embodiment, there are a smaller number of through holes.

[Embodiment 5]

Figure 11:
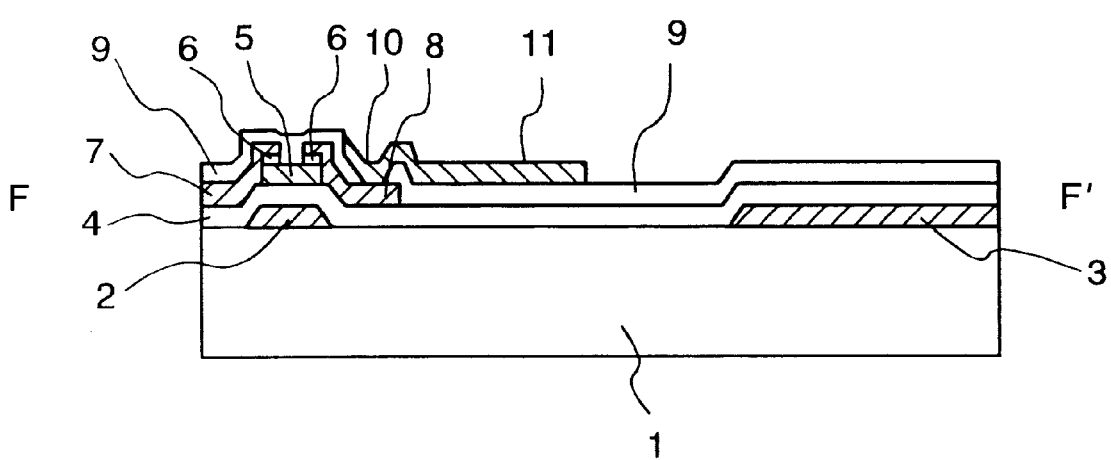
FIG. 11 is a sectional view of an active matrix substrate forming an embodiment 5 of the present invention.
Figure 12:
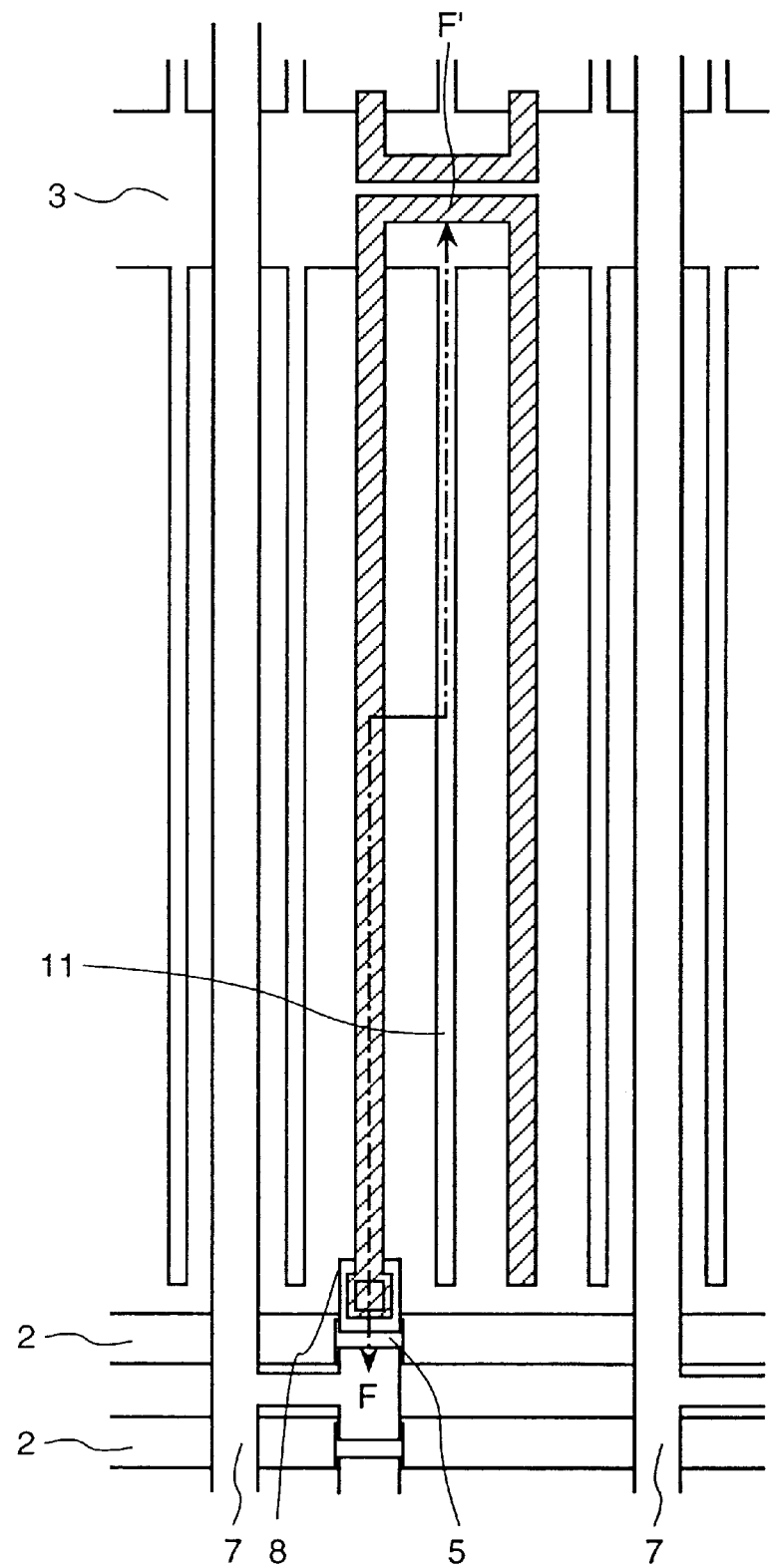
FIG. 12 is a plane view of the picture element of FIG. 11, and the F–F' cross section of this figure corresponds to FIG. 11.

A sectional view of the picture element of the active matrix substrate of the present invention is shown in FIG. 11, and a plane view thereof is shown in FIG. 12.

The gate electric wiring 2, the common electric wiring 3, the gate insulator film 4, the semi-conductor layer 5, the contact layer 6, the drain electric wiring 7 and the source electrode 8 are formed on transparent substrate 1 in the same way as in embodiment 1. The protective insulator film 9, the contact hole 10 and the picture electrode 11 also are formed with the same method as embodiment 1. According to the above-mentioned process, the counter electrode 12 and the common electric wiring 3 are connected to each other electrically.

An alignment film is formed on the active matrix substrate mentioned above, which substrate is then mounted on the opposite substrate through distance setting beads, and the liquid crystal composition is enclosed in it, whereby the liquid crystal display device is obtained. The liquid crystal driving voltage of the above liquid crystal display device may be reduced by 10% or more, compared with one using the active matrix substrate having a construction shown in FIG. 3 and FIG. 4.

In this embodiment, the counter electrode is formed by the same process as the common electrode. By the construction employed in this embodiment, there are a smaller number of through holes.

[Embodiment 6]

Figure 13:
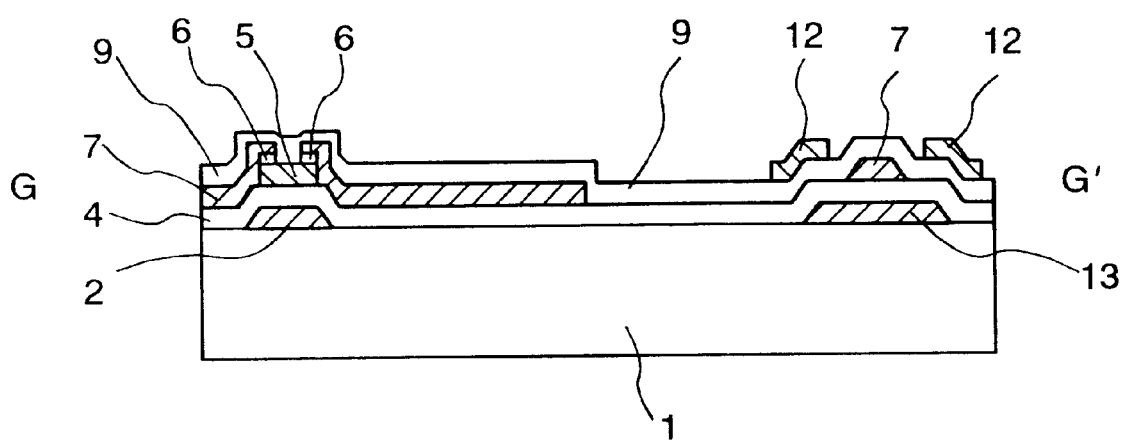
FIG. 13 is a sectional view of an active matrix substrate forming an embodiment 6 of the present invention.
Figure 14:
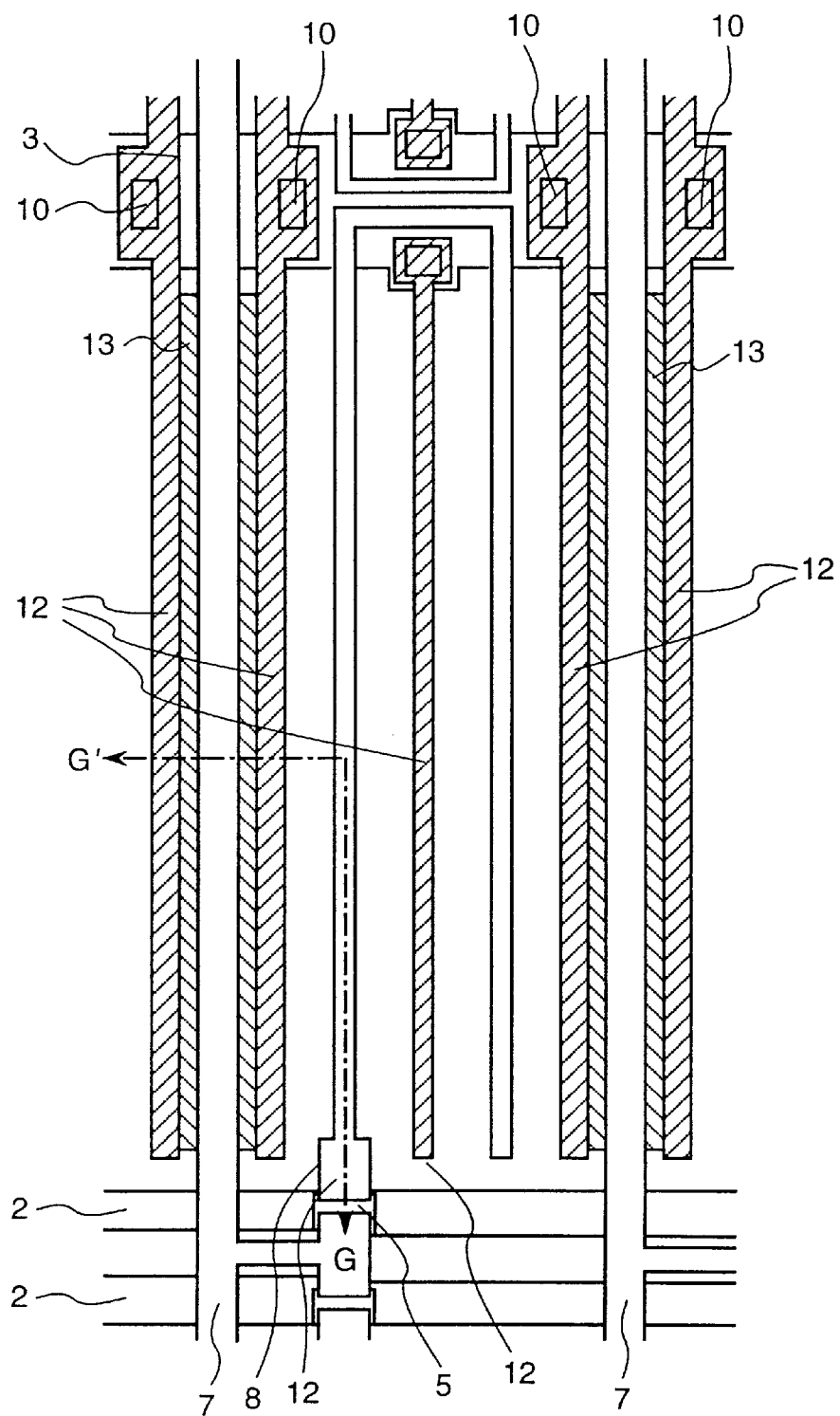
FIG. 14 is a plane view of the picture element of FIG. 13, and the G–G' cross section of this figure corresponds to FIG. 13.

A sectional view of a typical picture element of the active matrix substrate of the present invention is shown in FIG. 13, and a plane view thereof is shown in FIG. 14.

The gate electric wiring 2 is formed on transparent substrate 1 with the same method as embodiment 1. Here, at same time, the shading layer 13 is formed to overlap with the drain electric wiring 7 and the counter electrode 12 formed later. Then, the common electric wiring 3, the gate insulator film 4, the semi-conductor layer 5, the contact layer 6, the drain electric wiring 7 and the source electrode 8 are formed using the same method as embodiment 1. The protective insulator film 9, the contact hole 10 and the counter electrode 12 also are formed using the same method as embodiment 1. According to the above-mentioned process, the courter electrode 12 and the common electric wiring 3 are connected to each other electrically.

An alignment film is formed on the active matrix substrate mentioned above, which substrate is then mounted the opposite substrate through distance setting beads, and the liquid crystal composition is enclosed in it, whereby the liquid crystal display device is obtained. The liquid crystal driving voltage of the above liquid crystal display device may be reduced by 10% or more, compared with one using the active matrix substrate having a construction shown in FIG. 3 and FIG. 4. Moreover, by using the light shading layer 13, the black matrix of the opposite substrate in this part may be omitted, thereby resulting in an improved aperture ratio.

[Embodiment 7]

Figure 15:
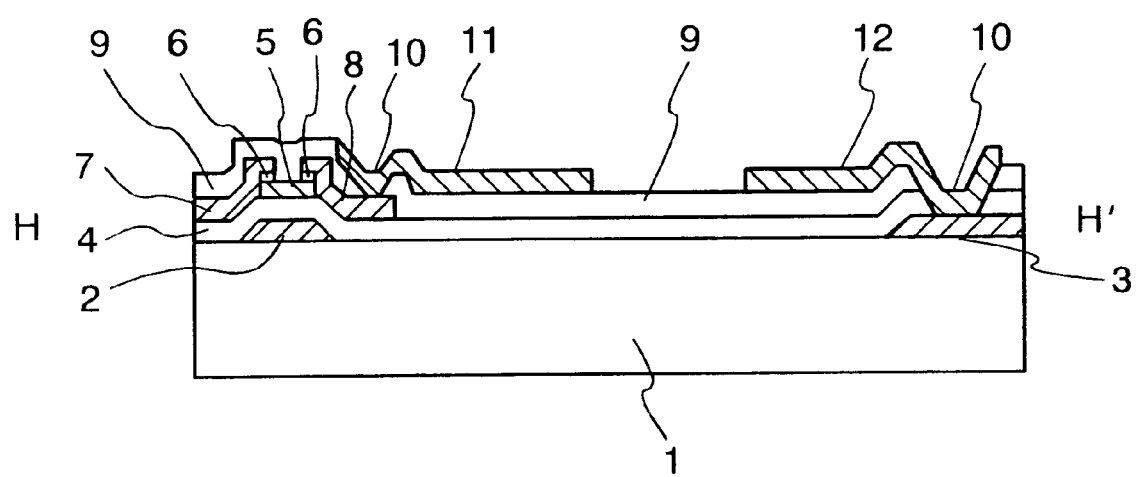
FIG. 15 is a sectional view of an active matrix substrate forming an embodiment 7 of the present invention.
Figure 16:
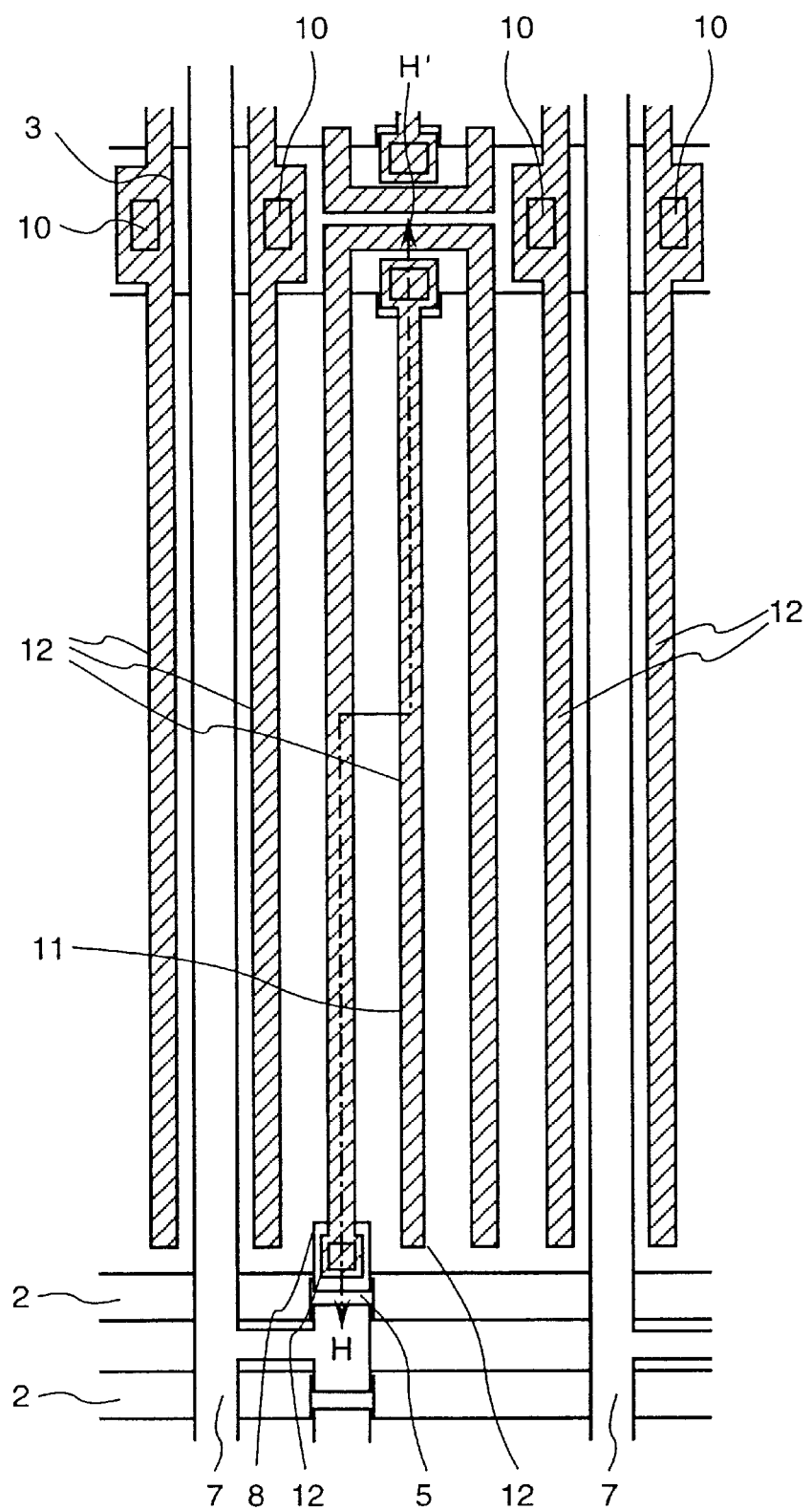
FIG. 16 is a plane view of the picture element of FIG. 15, and the H–H' cross section of this figure corresponds to FIG. 15.

A sectional view of a typical picture element of the active matrix substrate of the present invention is shown in FIG. 15, and a plane view thereof is shown in FIG. 16.

The gate electric wiring 2, the common electric wiring 3, the gate insulator film 4, the TFT, the drain electric wiring 7 and the source electrode 8 are formed in the same way as in embodiment 1. The protective insulator film 9 (SIN) is formed by plasma chemical vapor deposition thereon. Furthermore, the gate insulator film 4, the contact hole 10 to connect to the source electrode 8 and the common electric wiring 3 on the SiN film of the protective insulator film 9, and the contact hole of the drain electric wiring terminal, the gate electric wiring terminal and the drain electric wiring terminal are formed by a photo lithography method.

A graphite film is formed as a memblem having a thickness of 200 nm by a sputtering method. Then, the picture element electrode 11, the counter electrode 12, and the coating film of the drain electric wiring terminal, the gate electric wiring terminal, and the drain electric wiring terminal are formed by processing the graphite film using a photo lithography method.

An alignment film is formed on the active matrix substrate mentioned above, which substrate is then mounted on the opposite substrate through a distance setting piece, and the liquid crystal composition is enclosed in it, whereby the liquid crystal display device is obtained. Such a liquid crystal display device has the advantage that the liquid crystal driving voltage is small, and a bright image is able to be obtained.

[Embodiment 8]

Figure 17:
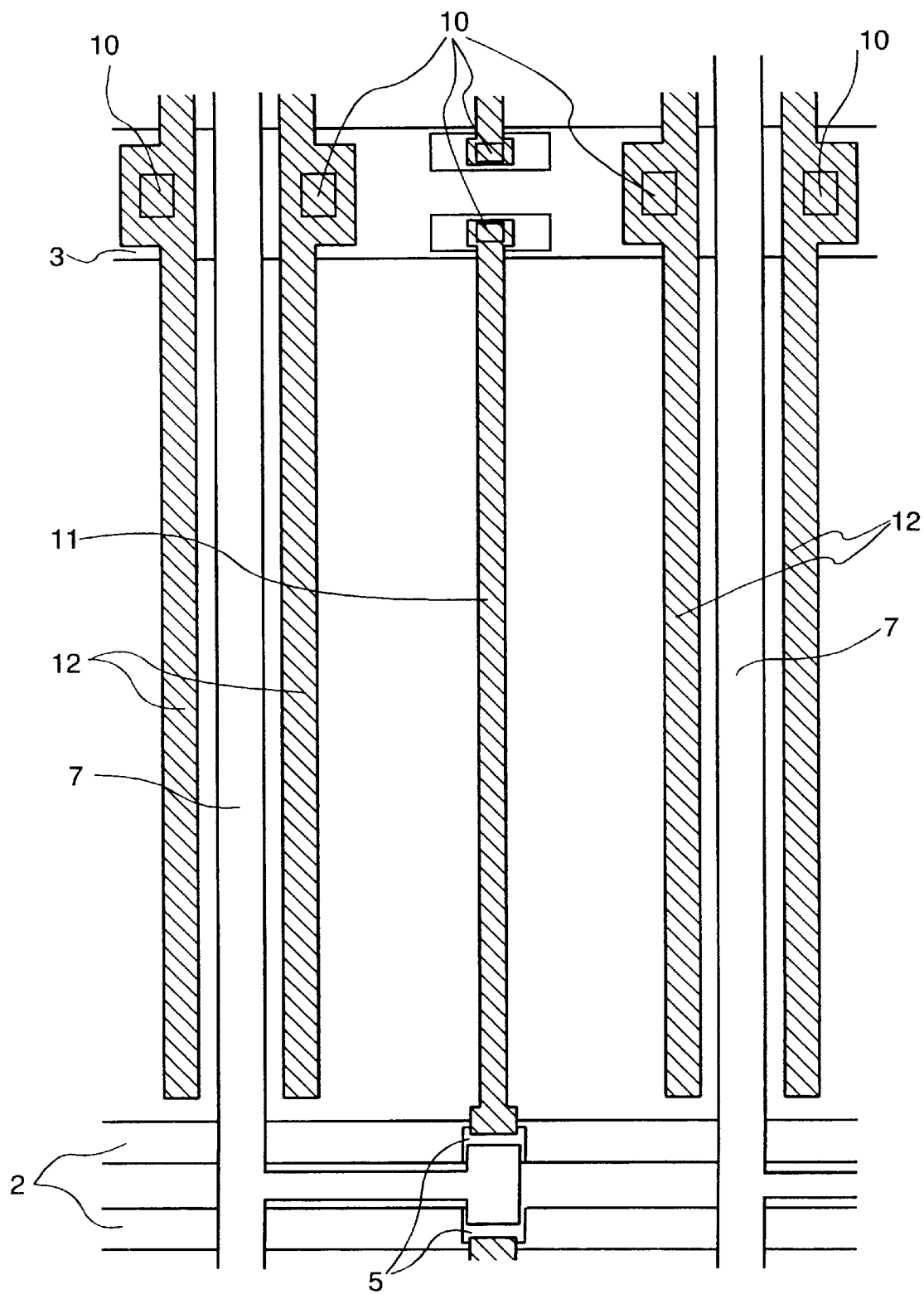
FIG. 17 is a sectional view of an active matrix substrate forming an embodiment 8 of the present invention.

An active matrix substrate, shown in plane view in FIG. 17, is formed by using the same method as embodiment 3. In the embodiment 3, as shown in FIG. 8, two picture element electrodes 11 and three counter electrodes 12 are provided in one picture element; however, in this embodiment 8, there are one picture element electrode 11 and two counter electrodes 12 in one picture element. Thereby, in this embodiment, a higher aperture ratio may be provided compared with that in the embodiment 3.

An alignment film is formed on the active matrix substrate mentioned above, which substrate is then mounted on the opposite substrate through a distance setting piece, and the liquid crystal composition is enclosed in it, whereby the liquid crystal display device is obtained. Such a liquid crystal display device as described above has the advantage that the liquid crystal driving voltage is small and a bright image is able to be obtained.

According to the present invention, the driving voltage of the liquid crystal display device using an in-plane-switching system may be reduced as mentioned above. Moreover, it becomes possible to use a liquid crystal having higher threshold driving voltage, with the result that a liquid crystal display device having fast responsiveness may be provided.

What is claimed is:

1. A liquid crystal display device comprising a pair of substrates, and a liquid crystal layer supported between said pair of substrates, said liquid crystal display device further comprising:

a plurality of gate electric wirings provided on one of said pair of substrates;

a plurality of drain electric wirings respectively intersecting with said plurality of gate electric wirings in a matrix configuration;

a plurality of thin film transistors formed on respective points of said gate electric wirings and said drain electric wirings;

a plurality of common electric wirings extending in the same direction as said gate electric wirings;

a plurality of picture elements, at least one of said picture elements being respectively surrounded by said gate electric wirings and said drain electric wirings; and a plurality of counter electrodes connected to said common electric wirings and extending in the same direction as said drain electric wirings, a plurality of picture element electrodes made of at least one of conductive oxide and graphite being connected to said thin film transistors and extending in the same direction as said drain electric wirings;

wherein an electric field having a component parallel to one of said pair of substrates is produced in said liquid crystal layer by an electric voltage applied between said counter electrodes and said picture element electrodes, and said respective picture element electrodes are separated from said liquid crystal layer by at least an alignment film which aligns molecules of said liquid crystal layer in a predetermined direction.

2. A liquid crystal display device as defined in claim 1, further comprising an insulator layer formed on said common electric wirings, wherein said picture element electrodes are respectively connected to said thin film transistors through a contract hole formed in said insulator layer formed on said thin film transistors.

3. A liquid crystal display device as defined in claim 1, wherein each source electrode serves as a picture element electrode.

4. A liquid crystal display device as defined in claim 3, wherein said counter electrodes are constructed of at least one of a conductive oxide film and graphite.

5. A liquid crystal display device as defined in claim 1, wherein a drain electric wiring terminal and a gate electric wiring terminal, in which said plural drain electric wirings and said plural gate electric wirings are connected to a drive circuitry, are constructed of at least one of a conductive oxide film and graphite.

6. A liquid crystal display device comprising a pair of substrates, and a liquid crystal layer supported between said pair of substrates, said liquid crystal display device further comprising:
   a plurality of gate electric wirings provided on one of said pair of substrates;
   a plurality of drain electric wirings respectively intersecting with said plurality of gate electric wirings in a matrix configuration;
   a plurality of thin film transistors formed on respective intersecting points of said gate electric wirings and said drain electric wirings;
   a plurality of common electric wirings extending in the same direction as said gate electric wirings;
   a plurality of picture elements, at least one of said picture elements being respectively surrounded by said gate electric wirings and said drain electric wirings; and
   a plurality of counter electrodes connected to said common electric wirings and extending in the same direction as said drain electric wirings, a plurality of said picture element electrodes being connected to said thin film transistors and extending in the same direction as a counter electrode corresponding to said respective picture elements;
   wherein said gate electric wirings and said common electric wirings are formed on the same layer and a first insulator layer is formed on said gate electric wirings and said common electric wirings, said drain electric wirings are formed on said first insulator layer, a second insulator layer is formed on said drain electric wirings, said counter electrodes are formed on said second insulator layer, said counter electrodes are connected to said corresponding common electric wirings through a contact hole formed in said first and second insulator layers, and said counter electrodes are separated from said liquid crystal layer at least by an alignment film which aligns molecules of said liquid crystal layer in a predetermined direction.

7. A liquid crystal display device comprising a pair of substrates, and a liquid crystal layer supported between said pair of substrates, said liquid crystal display device further comprising:
   a plurality of gate electric wirings provided on one of said pair of substrates;
   a plurality of drain electric wirings respectively intersecting with said plurality of gate electric wirings in a matrix configuration;
   a plurality of thin film transistors formed on respective points of said gate electric wirings and said drain electric wirings;
   a plurality of common electric wirings extending in the same direction as said gate electric wirings;
   a plurality of picture elements, at least one of said picture elements being respectively surrounded by said gate electric wirings and said drain electric wirings; and
   a plurality of counter electrodes connected to said common electric wirings and extending in the same direction as said drain electric wirings, a plurality of picture element electrodes made of at least one of conductive oxide and graphite being connected to said thin film transistors and extending in the same direction as said drain electric wirings;
   wherein an electric field having a component parallel to one of said pair of substrates is produced in said liquid crystal layer by an electric voltage applied between said counter electrodes and said picture element electrodes, and said respective picture element electrodes are in contact with said liquid crystal layer directly.

8. A liquid crystal display device as defined in claim 7, further comprising an insulator layer formed on said common electric wirings, wherein said picture element electrodes are respectively connected to said thin film transistors through a contract hole formed in said insulator layer formed on said thin film transistors.

9. A liquid crystal display device as defined in claim 7, wherein each source electrode serves as a picture element electrode.

10. A liquid crystal display device as defined in claim 9, wherein said counter electrodes are constructed of at least one of a conductive oxide film and graphite.

11. A liquid crystal display device as defined in claim 7, wherein a drain electric wiring terminal and a gate electric wiring terminal, in which said plural drain electric wirings and said plural gate electric wirings are connected to a drive circuitry, are constructed of at least one of a conductive oxide film and graphite.

* * * * *